United States Patent
Ly et al.

(10) Patent No.: US 8,338,735 B2
(45) Date of Patent: Dec. 25, 2012

(54) ELECTRODE WIRE FOR SPARK EROSION

(75) Inventors: Michel Ly, Annecy (FR); Gerald Sanchez, Annecy (FR)

(73) Assignee: Thermocompact, Metz Tessy (FR)

( * ) Notice: Subject to any disclaimer, the term of this patent is extended or adjusted under 35 U.S.C. 154(b) by 1065 days.

(21) Appl. No.: 12/021,015

(22) Filed: Jan. 28, 2008

(65) Prior Publication Data

US 2008/0179296 A1    Jul. 31, 2008

(30) Foreign Application Priority Data

Jan. 29, 2007   (FR) ...................................... 07 52951

(51) Int. Cl.
    *B23K 1/00*    (2006.01)
(52) U.S. Cl. ................. 219/69.12; 219/69.15; 219/69.11
(58) Field of Classification Search ............... 219/69.12, 219/69.15, 69.11, 69.17
    See application file for complete search history.

(56) References Cited

U.S. PATENT DOCUMENTS

| | | | |
|---|---|---|---|
| 4,287,404 A | 9/1981 | Convers et al. | |
| 4,977,303 A * | 12/1990 | Briffod | 219/69.12 |
| 5,882,490 A * | 3/1999 | Walder et al. | 219/69.12 |
| 5,945,010 A | 8/1999 | Tomalin | |
| 6,306,523 B1 * | 10/2001 | Seong | 428/613 |
| 6,417,489 B1 * | 7/2002 | Blankenship et al. | 219/145.31 |
| 6,608,286 B2 * | 8/2003 | Jiang | 219/145.31 |
| 6,781,081 B2 * | 8/2004 | Groos et al. | 219/69.12 |
| 6,794,597 B2 * | 9/2004 | Groos et al. | 219/69.12 |
| 2002/0092831 A1 * | 7/2002 | Seong | 219/69.12 |
| 2005/0040141 A1 * | 2/2005 | Ly | 219/69.1 |
| 2006/0219666 A1 | 10/2006 | Shin | |
| 2009/0025959 A1 * | 1/2009 | Tomalin | 174/126.2 |

FOREIGN PATENT DOCUMENTS

| | | |
|---|---|---|
| EP | 1 009 574 | 6/2000 |
| FR | 2 418 699 | 9/1979 |
| FR | 2881973 | * 8/2006 |

OTHER PUBLICATIONS

French Search Report for Application No. FR 0752951; Completed May 23, 2007.

* cited by examiner

*Primary Examiner* — M. Alexandra Elve
(74) *Attorney, Agent, or Firm* — RatnerPrestia

(57) ABSTRACT

The electrode wire according to the invention comprises a brass core (1) covered with a γ phase brass coating (2) having a structure fragmented into blocks (2a) between which the core (1) is exposed. The blocks (2a) have a thickness (E2) with a narrow distribution and produce a coverage of the core (1) according to a coverage rate greater than 50%. This produces a regular fragmentation of the coating, which improves the finish state of the machined parts.

6 Claims, 5 Drawing Sheets

ELECTRODE WIRE FOR SPARK EROSION

TECHNICAL FIELD OF THE INVENTION

The present invention concerns the electrode wires used for spark erosion machining.

The well-known spark erosion machining process removes material from an electrically conductive part by generating sparks in a machining area between the part to be machined and an electrically conductive electrode wire. The electrode wire moves continuously in the vicinity of the part in the direction of the length of the wire and is moved progressively in the transverse direction relative to the part either by translation of the wire or by translation of the part.

An electrical generator connected to the electrode wire by electrical contacts on either side of the machining area establishes an appropriate potential difference between the electrode wire and the conductive part to be machined. The machining area between the electrode wire and the part is immersed in an appropriate dielectric fluid. The potential difference causes sparks to appear between the electrode wire and the part to be machined that progressively erode the part and the electrode wire. The longitudinal movement of the electrode wire preserves at all times a sufficient wire diameter to prevent it breaking in the machining area. The relative movement of the wire and the part in the transverse direction cuts the part or treats its surface, where applicable.

The particles detached from the electrode wire and from the part by the sparks are dispersed in the dielectric fluid, in which they are evacuated.

At present there are numerous types of electrode wire for spark erosion, each of which has particular properties that can justify choosing it for a particular type of spark erosion machining.

The structure of the electrode wire must generally have sufficient mechanical strength to prevent the wire breaking in the sparking area. A high mechanical strength is good for applying a high longitudinal tension to the electrode wire in the machining area in order to guarantee very accurate positioning of the wire and therefore accurate machining.

The achievement of machining accuracy, in particular the production of angle cuts with a small radius, necessitates the use of wires of small diameter and withstanding a high mechanical load at rupture to be tensioned in the machining area and to limit the amplitude of vibrations.

Most modern spark erosion machines are designed to use uncoated brass wires, generally of 0.25 mm diameter, and with a yield strength from 400 to 1000 N/mm$^2$.

If possible, the structure of the wire is chosen so that the behavior of the electrode wire encourages erosion, i.e. so that the wire produces fast erosion. The maximum rate of erosion of a wire is the limit rate beyond which the wire breaks if the sparking energy is increased to accelerate erosion.

Another important parameter of spark erosion machining is the quality of the surface state that can be obtained in the machined area of the part. The sparks produced between the electrode wire and the part produce microcraters in the part to be machined, i.e. localised removal of material. Clearly the surface state obtained depends on the parameters of the sparks, which in turn depend in particular on the structure of the electrode wire.

It is difficult to find an electrode wire structure that simultaneously optimizes the three parameters of rate of machining, accuracy of machining and surface state.

For example, brass wires have been proposed containing from 35 to 37% of zinc, with a homogeneous structure, which constitute an economically acceptable compromise, but obtained at the cost of a relatively low rate of erosion.

Coated wires have also been proposed, i.e. wires consisting of a metal core coated with a generally homogeneous surface layer of metal or alloy. During spark erosion machining, the electric arc formed between the surface of the electric wire and the surface of the part, through the dielectric, such as water, does not reach the centre of the wire. It is the coating of the wire that is worn.

The benefit of coated wires is that the core of the wire can be chosen as a function of its electrical and mechanical properties and the coating chosen as a function of its erosion properties and its contact resistance.

Accordingly, the document FR 2 418 699 proposes to coat the core with an alloy of zinc, cadmium, tin, lead, bismuth or antimony. The document teaches that the rate of machining is improved by the coating.

It has already been found that a coating containing a high proportion of a metal with a low sublimation specific heat produces a higher rate of cutting, the coating providing improved protection of the core during sparking.

Thus pure zinc has been used as the metal with a low sublimation specific heat but the layer of pure zinc wears very quickly, and does not protect the core of the wire for a sufficient time for cutting high parts.

In this same line of thinking, a coating has been used of an alloy containing a large quantity of zinc, for example a β phase alloy with 47% of zinc, or even a γ phase alloy of copper and zinc with a zinc content in excess of 50% by weight. A problem is then that the γ phase alloy of copper and zinc is relatively hard and brittle, so that the coating can fragment during a wire drawing operation that sizes the wire during its fabrication.

The document EP 1 009 574 has demonstrated that the fragmentation of the γ phase copper and zinc alloy coating is not unfavorable, and produces an electrode wire having good rates of spark erosion. The document teaches for this purpose a wire fabrication process in which, after producing a zinc coating and diffusion of the zinc of the coating and of the copper of the core by heating for 1 to 4 hours, the wire is sized by drawing it to reduce its diameter in a ratio between the final diameter Df and the initial diameter Di of less than 0.4. During drawing, the coating is fragmented into blocks which, because of the lengthening of the wire caused by drawing it, are redistributed on the surface of the wire. The document teaches that the redistribution is advantageous because it distributes in a single wire surface layer the blocks resulting from the fragmentation of the coating, and thus ensures a rate of covering of the core in excess of 50%, possibly around 58%.

Such a wire nevertheless has mediocre properties when it is used in finishing procedures. In particular relatively marked ripples are found on the surface of the machine parts, in the direction perpendicular to the movement of the wire in the spark erosion machine.

If excellent surface states are to be obtained on parts machined by spark erosion, there is generally effected a blanking step during which the spark erosion wire receives a high sparking energy and cuts the part at high speed, after which five to ten finishing steps are carried out during which the sparking energies are lower.

The final finishing operations are effected with very low sparking energies. Clearly the lower the sparking energy, the smaller the erosion craters, and the finer the surface state obtained on the machined part, and the lower its roughness. The roughness is generally characterized by the parameter Ra defined by the ISO standard 4287:1997 for example.

In the case of a ripple, this defect is characterized by a ripple parameter Wt also defined by the ISO standard 4287: 1997 for example.

FIGS. 1 and 2 show the ripples that are observed with wires according to the document EP 1 009 574.

FIG. 1 represents the surface S of the part to be machined, seen from in front, with the spark erosion wire F that is moving axially along the surface S in the direction of movement F1 relative to the spark erosion machine, and which is moving transversely along the surface S in the direction F2 of advance of the wire to sweep the surface S of the part.

In FIG. 1, the ripples O are visible to the naked eye in the form of striations parallel to the wire F. In FIG. 2 it is seen that the area O is rippled after the passage of the wire F over the surface S of the part.

It is desirable for the ripples O to be below the threshold of visibility to the naked eye, in order for the appearance of the machined surface of the part to appear perfect.

SUMMARY OF THE INVENTION

There is therefore a need to design a new spark erosion wire structure with a fragmented γ phase brass surface layer which, whilst preserving a high rate of machining during cutting steps, offers better spark erosion properties during finishing steps, enabling smoother machined surfaces to be obtained characterized in particular by a ripple parameter Wt below 0.4.

The present invention results from the observation that there is a cause and effect link between the redistribution of the γ phase brass alloy coating blocks in a wire according to the document EP 1 009 574 and the presence of ripples on the machined surface of the part at the end of the finishing step. This can be explained by the following considerations.

During a process according to the document EP 1 009 574 in which a redistribution of the blocks occurs, the γ phase alloy blocks, during a wire drawing step, fracture not only laterally, i.e. in the direction of the length of the wire and in the direction of its periphery, but also in two or more layers in the direction of the thickness of the wire, and are distributed on the surface of the core of the wire. It is the fracture into a plurality of layers that enables the redistribution and the corresponding increase in the area of wire covered by the γ phase brass alloy blocks.

However this fracture produces blocks of random size with a relatively wide distribution of sizes, i.e. blocks whose sizes are highly variable and can comprise all sizes between large blocks and small blocks.

In practice, certain blocks can preserve their initial thickness without being fractured in the depthwise direction, while other blocks can be fractured to unequal depths, varying at random as a function of any areas of weakness possibly present in the γ phase brass layer before wire drawing.

According to the invention, it is the fractured and redistributed state of the γ phase brass surface layer that is the cause of the serious residual ripples on the surface S of the part after finishing spark erosion.

To achieve the above and other objects, the invention proposes an electrode wire for spark erosion machining, comprising a core in a first alloy of copper and zinc with a zinc content between 20% and 45% by weight, and comprising a coating produced on said core, said coating comprising a second alloy of copper and zinc wherein the zinc content is greater than 50% by weight and that has a structure fragmented into blocks between which the core is exposed; According to the Invention, in the Coating:

the second alloy blocks have a thickness with a narrow distribution, the ratio of the thicknesses of the smallest blocks and the largest blocks of the majority of the blocks present being greater than 0.6, and the second alloy blocks provide more than 50% coverage of the core.

It is easier to obtain a narrow distribution of the block thicknesses if the coating of the blank wire before wire drawing has a thickness less than or equal to approximately 7 μm. It is therefore advantageous to produce a spark erosion wire in which the approximate thickness of the second alloy blocks is less than 7 μm.

In practice, for a wire diameter of 0.250 mm, the approximate thickness of the blocks can for the most part be from 4 μm to 5 μm.

Good results will be obtained by choosing a first core alloy consisting primarily of an α phase alloy of copper and zinc, or a mixture of an α phase alloy of copper and zinc and a β' phase alloy of copper and zinc.

Similarly, the second alloy could consist for the most part of a γ phase alloy of copper and zinc.

BRIEF DESCRIPTION OF THE DRAWINGS

Other objects, features and advantages of the present invention will emerge from the following description of particular embodiments, given with reference to the appended figures, in which.

DESCRIPTION OF THE PREFERRED EMBODIMENTS

Figure 3:
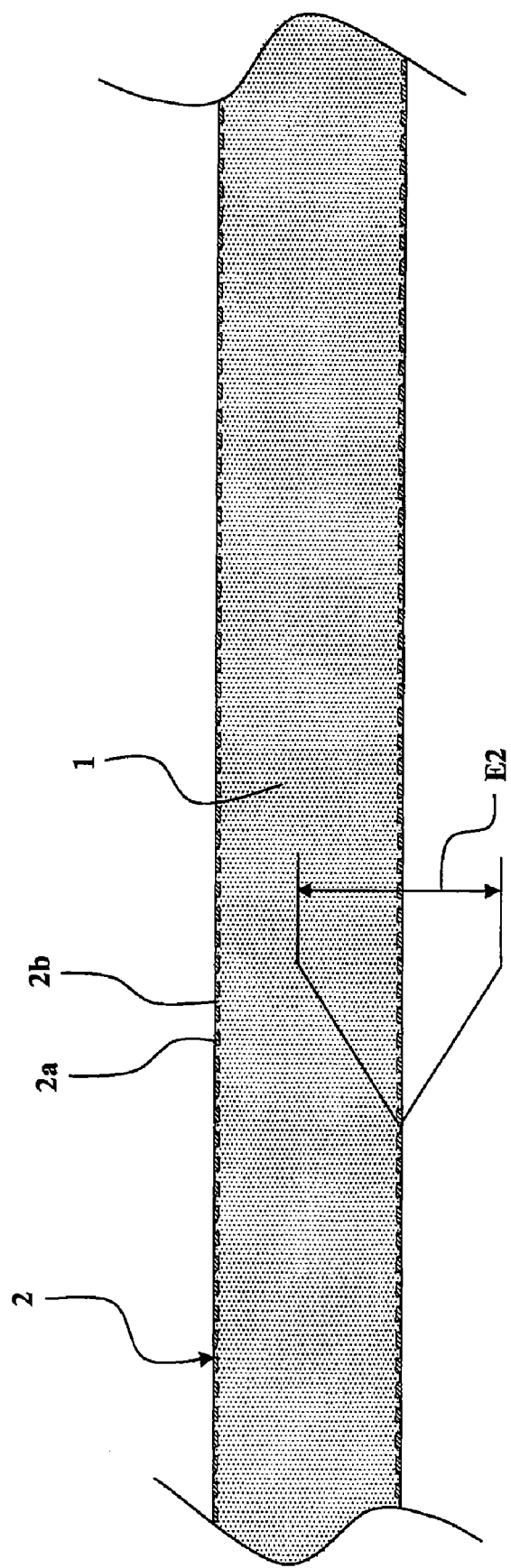
FIG. 3 is a diagrammatic view in longitudinal section of one embodiment of an electrode wire according to the invention.
Figure 4:
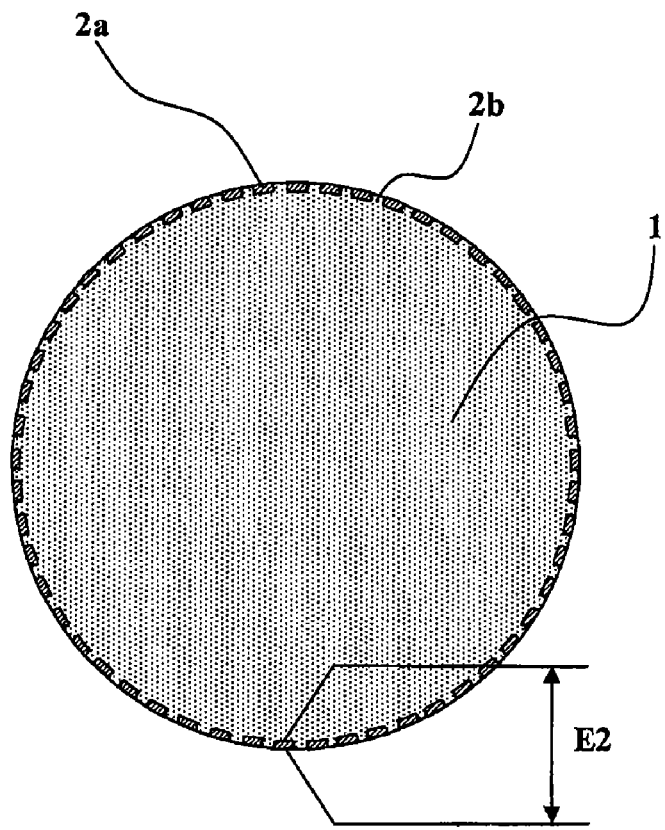
FIG. 4 is a diagrammatic view in cross section to a larger scale of the electrode wire from FIG. 3.
Figure 5:
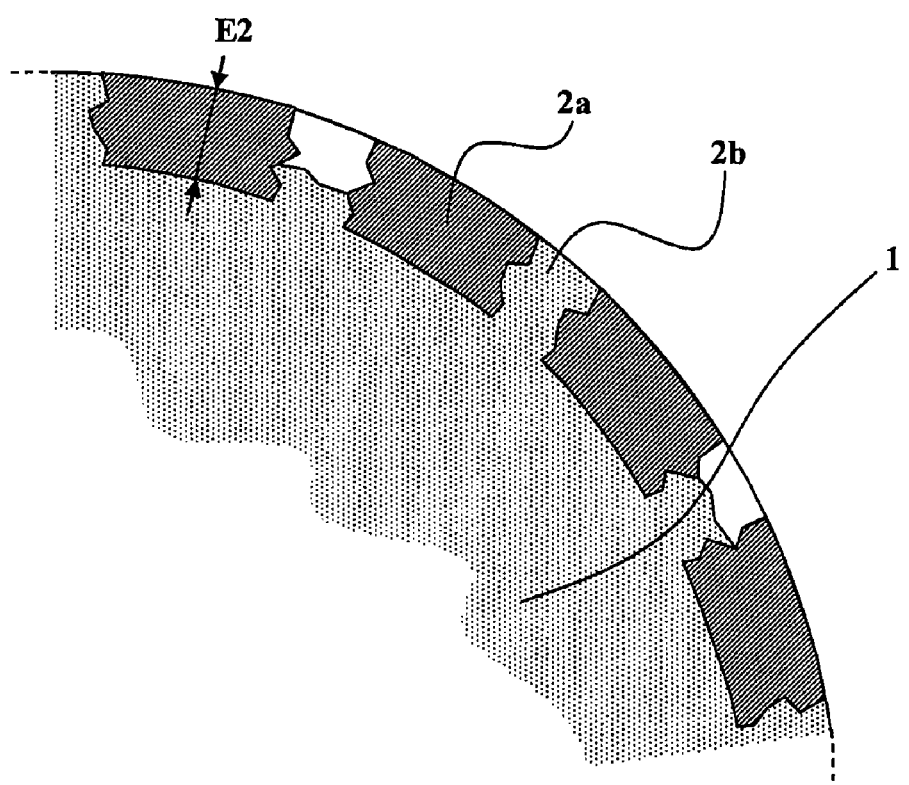
FIG. 5 is an enlarged view of the FIG. 4 cross section.

Consider first the structure of the wire shown in FIGS. 3 to 5.

In this embodiment, the electrode wire according to the invention is a generally cylindrical wire having a diameter of approximately 0.25 mm. In the FIG. 3 longitudinal diametral section, the core 1 and the coating 2 can be seen.

The homogeneous core 1 consists of an alloy of copper and zinc with a zinc content from 20% to 45% by weight, advantageously constituting an α phase alloy (zinc content less than approximately 37%) or a mixture of β' phase alloy and α phase alloy (zinc content of the mixture between 38% and 45%).

The coating 2 is a heterogeneous structure, consisting of blocks of a second alloy of copper and zinc with a zinc content greater than 50% by weight. The blocks 2a are separated from each other by interstices 2b in which the core 1 can be distinguished.

The second alloy blocks 2a have a thickness E2 having a narrow distribution, meaning that the blocks 2a substantially all have thicknesses that are very similar to each other. Good spark erosion finishing results are obtained if the ratio of the thicknesses of the smallest blocks and the largest blocks in the majority of the blocks 2a present is greater than 0.6. In practice, spark erosion wires can advantageously be produced in which more than 80% of the blocks have thicknesses E2 in a ratio to each other greater than 0.8.

The same features are seen again in FIGS. 4 and 5, namely a relatively constant thickness E2 of the blocks 2a and interstices 2b.

Moreover, the second alloy blocks 2a provide a rate of coverage of the core 1 greater than 50%. This means that more than 50% of the surface of the core 1 is covered by blocks 2a.

In practice, most of the blocks 2a have an approximate thickness E2 between 4 μm and 5 μm for a wire of 0.250 mm diameter.

The second alloy constituting the blocks 2a consists primarily of a γ phase alloy, while the first alloy constituting the core 1 consists primarily of an α phase alloy or a mixture of an α phase alloy and a β' phase alloy.

The wire structure that has just been described can be obtained by a method that is described next with reference to FIGS. 6 and 7, for example.

During a first step a), a core 1 is provided in copper and zinc alloy with a zinc content between 20% and 45% by weight. The initial diameter of the core is chosen to be greater than the final diameter of the wire, which is advantageous for reducing production costs. For example, the starting core 1, in an alloy of 63% of copper and 37% of zinc, can have a diameter of 0.5 mm.

In the second step b), the core 1 is coated with a layer of zinc, having a thickness of 3 μm, for example.

During a third step c), the core coated in this way is heated to form a blank having a blank diameter De and a surface layer of γ phase copper and zinc alloy that covers the core 1. The diameter De of the blank is chosen to be fairly close to the final diameter Df. The thickness of the γ phase surface layer obtained is approximately twice the initial zinc layer thickness.

During a subsequent step d), the blank is cooled to room temperature. A blank such as shown in FIG. 6 is obtained.

Figure 7:
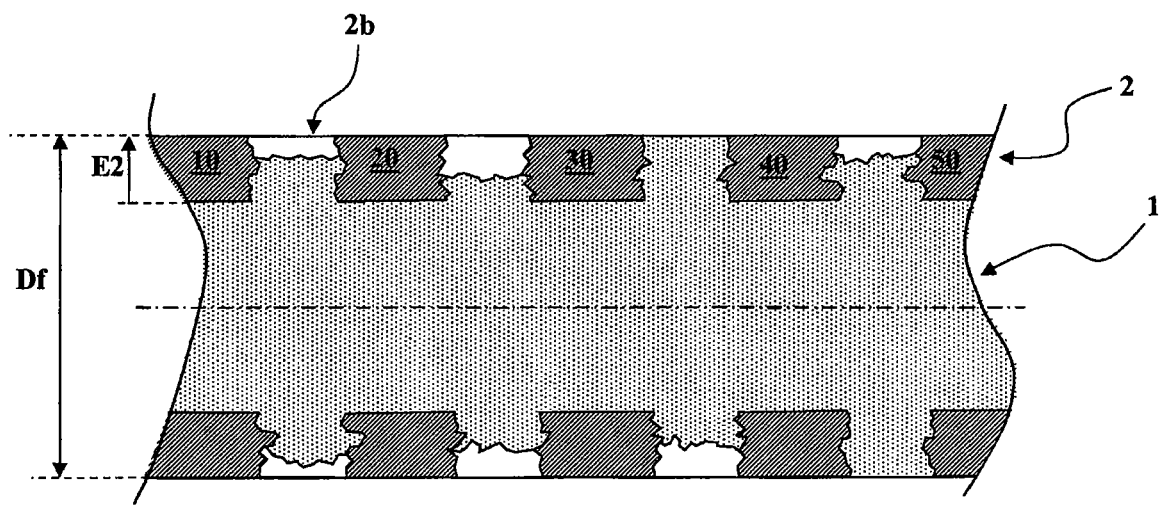

During a final step e), the blank is drawn at room temperature to the required final diameter Df of the wire, as shown in FIG. 7.

To obtain the particular coating structure with blocks of similar sizes ensuring good coverage of the core, the ratio Df/De is relatively high, preferably between 0.4 and 0.8. In other words, the wire drawing produces a relatively small reduction of diameter.

Moreover, during the step c) of heating the core, it is heated to an approximate temperature between 177° C. and 180° C. for an approximate period between 5 and 7 hours.

As a result, a core 1 is simultaneously produced having good mechanical properties.

According to one possibility, the zinc deposition step b) can be carried out by electrolytic deposition.

According to the invention, the blank can also be produced from a larger core wire, for example one having a diameter of 1 mm, that is covered with a 6 μm layer of zinc and is drawn to the blank diameter De of 0.5 mm before diffusion. The same blank structure with a zinc layer of approximately 3 μm is then found again.

Consider FIGS. 6 and 7 again.

Figure 6:
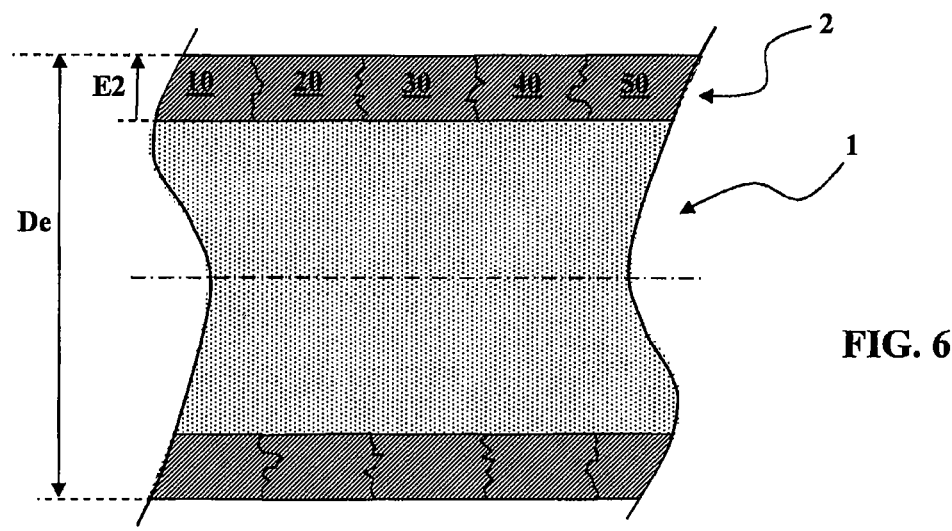
FIGS. 6 and 7 illustrate a process for the fabrication of the electrode wire according to the present invention.

FIG. 6 shows a longitudinal section of a wire blank according to the invention before the wire drawing step: the coating has an initial thickness E2 and there are shown coating areas 10, 20, 30, 40 and 50 that will subsequently be separated by fractures during wire drawing. The initial diameter of the wire is De.

FIG. 7 shows the electrode wire drawn down by the wire drawing process, having assumed a diameter Df smaller than De. The blocks 10, 20, 30, 40, and 50 are seen again, which have been moved away from each other by virtue of the interstices 2b although remaining on the surface of the wire and retaining a constant thickness E2.

In practice, the layer of blocks 10-50 present in the wire blank before wire drawing (FIG. 6) is fragmented into a single layer by the wire drawing and produces at the end of wire drawing (FIG. 7) a structure with a layer of separate blocks 10-50 of relatively constant thickness equal to the initial thickness E2 of the coating. The relatively constant thickness of the blocks 10-50 is a result of the fact that the blocks have not been fractured in the direction of their thickness and have therefore not been redistributed.

Figure 8:
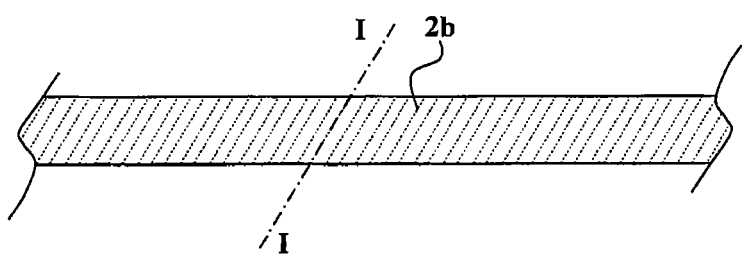
FIG. 8 shows diagrammatically the external surface of a length of electrode wire according to one embodiment of the invention.

It is found that the process for producing such fragmentation without distribution usually produces a wire whose external surface is recognizable by the presence of preferred orientations of the fractures 2b. This is shown in FIG. 8: the fractures 2b of the γ phase brass alloy appear to be aligned in oblique rows parallel to the direction I-I, constituting preferred orientations.

Figure 9:
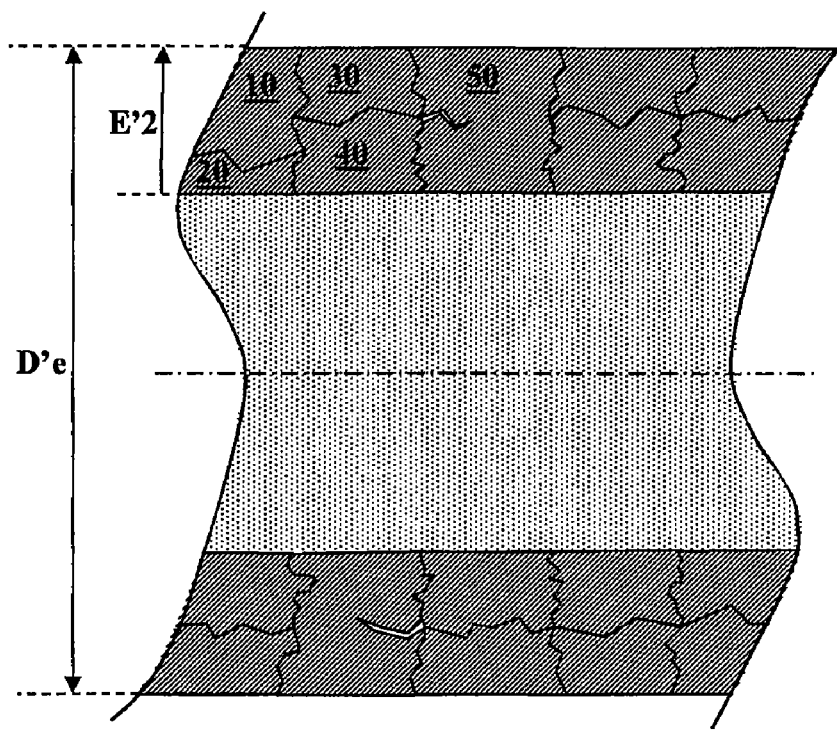
FIGS. 9 and 10 show by difference the prior art wire fabrication process according to the document EP 1 009 574.
Figure 10:
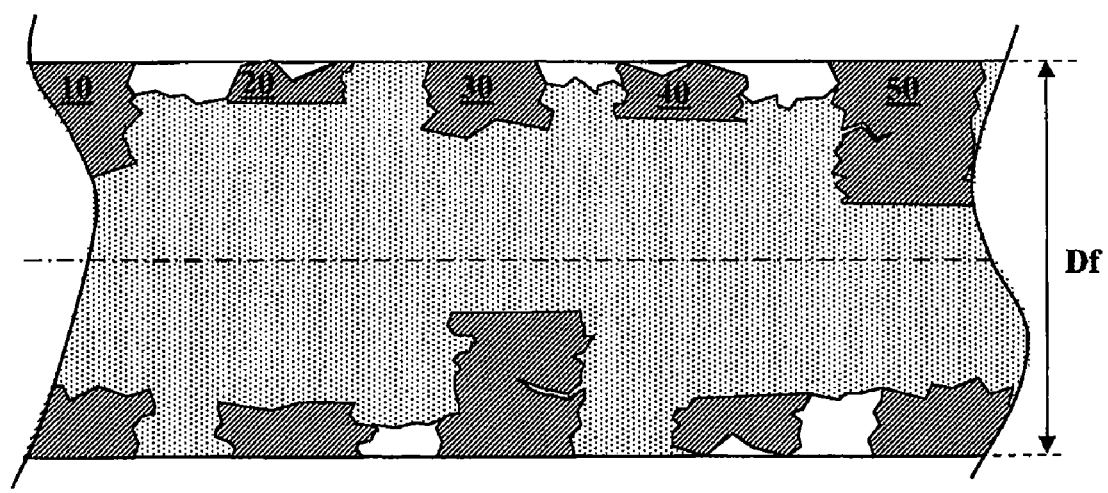

Consider now FIGS. 9 and 10 which show a prior art method like that of the document EP 1 009 574. In this case, wire drawing is effected starting from a diameter D'e greater than the diameter De to arrive at the same final diameter Df. Before wire drawing (FIG. 9), the coating has a thickness E'2 greater than the thickness E2 and the areas 10-50 can be seen. During wire drawing, because of the greater thickness E'2 and the smaller ratio Df/D'e, the coating is fragmented laterally and at the same time fragmented in depth into at least two layers to separate the blocks 10-50 from each other. The coating is then redistributed with an irregular thickness, as shown in FIG. 10. It will be noted that the schematic FIG. 10 illustrates a relatively wide distribution in the thickness of the blocks 10-50, with very large blocks 50 that have not been fractured in depth, with smaller blocks 20 or 40, and with blocks 10 or 30 of medium size. Small blocks such as the blocks 20 or 40 are liable to constitute a powder. The invention avoids this.

In practice a redistributed γ phase brass layer consists of three types of blocks:

blocks remaining attached to the core in their original position, and not cracked (for example the block 50), blocks in the process of cracking, fragments of blocks separated from each other and then moved and stuck again to the surface of the core during wire drawing, producing a higher rate of covering of the core.

The irregular sizes of the blocks resulting from redistribution, as well as the cracking of the blocks and their resticking to the surface of the core, during the wire drawing operation, are liable to cause electrical conduction problems.

Electrical conduction is necessary for feeding current from the generator of the spark erosion machine to the wire, through its exterior surface.

Figure 1:
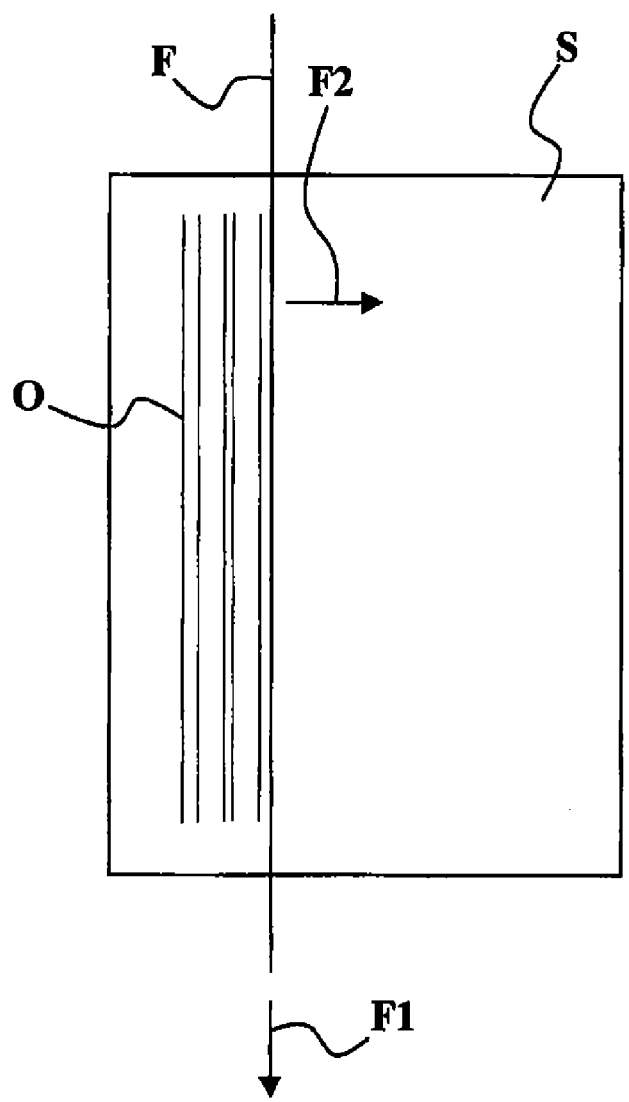
FIGS. 1 and 2 show the presence of ripples on a surface machined by spark erosion.
Figure 2:
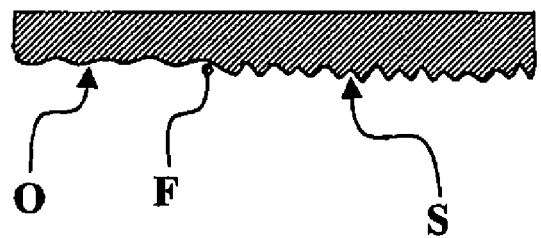

It is probable that these irregularities of structure and thickness of the redistributed wire surface layer render sparking unstable, and cause on the surface S (FIGS. 1 and 2) peaks and troughs in the direction F2 of advance of the wire F. This is probably the reason why, in the case of using a redistributed surface layer wire, the ripple parameter Wt measured on the finished machined part remains higher than 0.5 μm.

The effect produced by the present invention has been demonstrated by effecting measurements of the ripple parameter Wt in particular on two parts machined with the aid of respective sample wires:

sample 1: an electrode wire according to the document EP 1 009 574, of diameter equal to 0.25 mm, with an α phase brass core, the surface layer whereof comprises cracked and redistributed γ phase brass blocks, having measured thicknesses between 2.3 µm and 5.1 µm;

sample 2: an electrode wire according to the present invention, of diameter equal to 0.25 mm, with an α phase brass core, with a surface layer consisting of fractured and non-redistributed γ phase brass blocks, in which more than 80% of the blocks have a thickness between 4 µm and 4.3 µm.

Using both of the sample wires, a respective 50 mm high part in Z160DCV12 tool steel was machined and six finishing steps were carried out using an AGIE Agiecut Evolution II SFF (usage mark) machine (year 2001).

The ripple parameter Wt of the finished surface obtained by both of the sample wires was then measured using a MAHR Perthometer S2 (usage mark) (manufactured in 2006), with an MAHR PZK (usage mark) advance unit, and a 90° angle, 2 µm radius MAHR MFW250 (usage mark) feeler.

The measurement parameters were:
evaluation length: 0.8 mm
cut length (filter): 0.8 mm
number of lengths: five evaluation lengths, plus one before and one after, i.e. total travel 5.6 mm.

The result of the measurement was:
with sample 1: Wt=0.9 µm
with sample 2: Wt=0.39 µm.

Thus a very significant improvement to the ripple parameter Wt is obtained on the parts following the finishing steps carried out with a spark erosion wire according to the invention.

The present invention is not limited to the embodiments explicitly described, but encompasses variants and generalizations within the scope of the following claims.

The invention claimed is:

1. Electrode wire for spark erosion machining, comprising a core in a first alloy of copper and zinc with a zinc content between 20% and 45% by weight, and comprising a coating produced on said core, said coating comprising a second alloy of copper and zinc wherein the zinc content is greater than 50% by weight, and said coating having a structure fragmented into second alloy blocks between which there are fractures where the core is exposed, wherein, in the coating:

the second alloy blocks have a thickness with a narrow distribution, the ratio between the thicknesses of smaller second alloy blocks and larger second alloy blocks of the majority of the second alloy blocks present being greater than 0.6, and the second alloy blocks provide a coverage of the core according to a coverage rate greater than 50%.

2. Electrode wire according to claim 1, wherein the thickness of the second alloy blocks is less than approximately 7 µm.

3. Electrode wire according to claim 1, wherein, for a wire diameter of approximately 0.250 mm, the approximate thickness of the second alloy blocks is for the most part between 4 µm and 5 µm.

4. Electrode wire according to claim 1, wherein the first alloy of the core consists primarily of an α phase alloy of copper and zinc or a mixture of an α phase alloy of copper and zinc and a β' phase alloy of copper and zinc.

5. Electrode wire according to claim 1, wherein the second alloy consists primarily of a γ phase alloy of copper and zinc.

6. Electrode wire according to claim 1, wherein, at the surface of the wire, the fractures between the second alloy blocks have preferred orientations.

* * * * *